(12) United States Patent
Bauduin et al.

(10) Patent No.: US 10,830,248 B2
(45) Date of Patent: Nov. 10, 2020

(54) AIR-FLOW CIRCUIT FOR AIR FLOW THROUGH A BEARING ENCLOSURE

(71) Applicant: SAFRAN TRANSMISSION SYSTEMS, Colombes (FR)

(72) Inventors: Lionel Bauduin, Houilles (FR); Maxence Guillemont, Paris (FR); Julien Viel, Argenteuil (FR); Stéphane Prunera-Usach, Rueil Malmaison (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 469 days.

(21) Appl. No.: 15/311,045

(22) PCT Filed: Apr. 28, 2015

(86) PCT No.: PCT/FR2015/051153
§ 371 (c)(1),
(2) Date: Mar. 9, 2017

(87) PCT Pub. No.: WO2015/173488
PCT Pub. Date: Nov. 19, 2015

(65) Prior Publication Data
US 2017/0191485 A1    Jul. 6, 2017

(30) Foreign Application Priority Data
May 15, 2014   (FR) .................... 14 54327

(51) Int. Cl.
*F02D 29/06* (2006.01)
*F01D 25/20* (2006.01)
(Continued)

(52) U.S. Cl.
CPC ......... *F04D 29/063* (2013.01); *F01D 25/183* (2013.01); *F01D 25/20* (2013.01);
(Continued)

(58) Field of Classification Search
CPC .... F04D 29/063; F04D 29/056; F04D 29/053; F04D 29/284; F04D 29/441; F01D 25/183; F01D 25/20; F01M 1/12; F16N 31/00
See application file for complete search history.

(56) References Cited

U.S. PATENT DOCUMENTS 2,983,331 A * 5/1961 Helsley, Jr. .......... F16N 39/002
                                                  96/212
6,257,834 B1 * 7/2001 Bremer .................. F01D 25/12
                                                  415/176
(Continued)

FOREIGN PATENT DOCUMENTS

EP   1 933 077 A1   6/2008
EP   2 592 252 A2   5/2013
(Continued)

OTHER PUBLICATIONS

International Search Report as issued in International Patent Application No. PCT/FR2015/051153, dated Jul. 17, 2015.

*Primary Examiner* — Syed O Hasan
(74) *Attorney, Agent, or Firm* — Pillsbury Winthrop Shaw Pittman LLP

(57) ABSTRACT

An air-flow circuit for air flow through a bearing enclosure of a turbine engine, the air-flow circuit including a supply system arranged such as to supply the air into the bearing enclosure; a discharge system arranged such as to discharge at least some of the air from the bearing enclosure; an oil-removal system connected to the discharge system, the oil-removal system being capable of reducing the amount of lubricant contained in the air coming from the discharge system; and a compressor arranged between the discharge system and the oil-removal system, the compressor being capable of increasing the air pressure at the intake of the oil-removal system.

7 Claims, 3 Drawing Sheets

(51) Int. Cl.
*F04D 29/063* (2006.01)
*F16N 31/00* (2006.01)
*F01M 1/12* (2006.01)
*F01D 25/18* (2006.01)
*F04D 29/053* (2006.01)
*F04D 29/056* (2006.01)
*F04D 29/28* (2006.01)
*F04D 29/44* (2006.01)
*F01M 13/02* (2006.01)

(52) U.S. Cl.
CPC .............. *F01M 1/12* (2013.01); *F04D 29/053* (2013.01); *F04D 29/056* (2013.01); *F04D 29/284* (2013.01); *F04D 29/441* (2013.01); *F16N 31/00* (2013.01); *F01M 2001/126* (2013.01); *F01M 2013/026* (2013.01)

(56) References Cited

U.S. PATENT DOCUMENTS

| | | | | |
|---|---|---|---|---|
| 6,470,666 B1* | 10/2002 | Przytulski | ............. | F01D 25/125 184/6.11 |
| 2011/0314830 A1* | 12/2011 | Legare | ................... | F01D 25/20 60/772 |
| 2015/0056065 A1* | 2/2015 | Takama | ................ | F01D 25/166 415/119 |

FOREIGN PATENT DOCUMENTS

| FR | 2 952 402 A1 | 5/2011 |
|---|---|---|
| FR | 2 995 053 A1 | 3/2014 |
| FR | 3 011 882 A1 | 4/2015 |

* cited by examiner

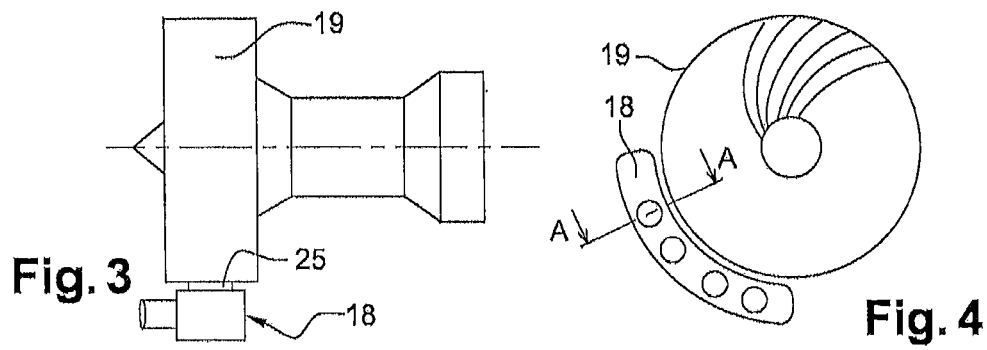
Fig. 3
Fig. 4
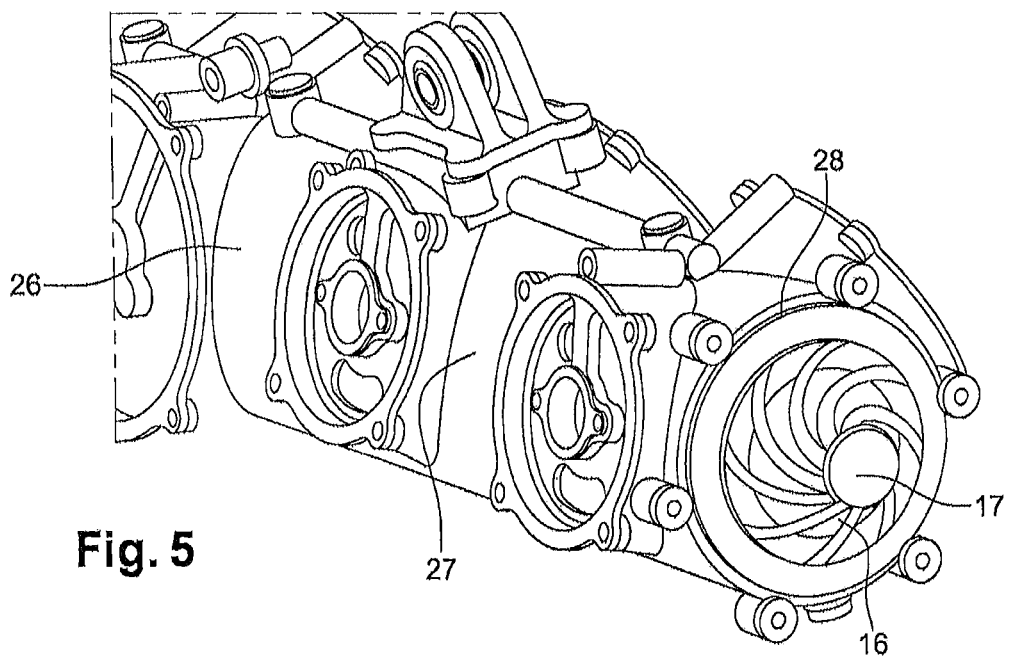
Fig. 5
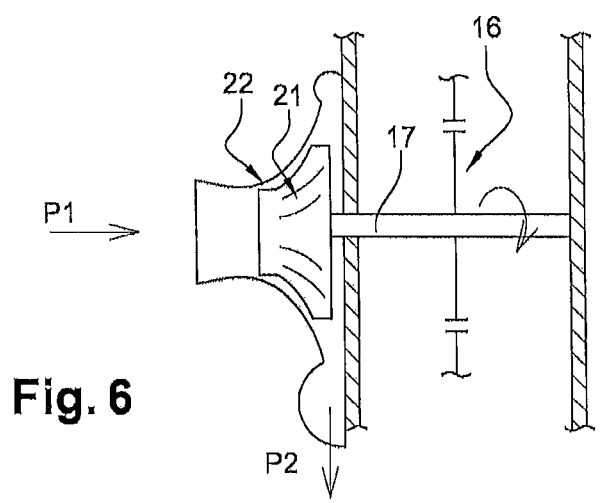
Fig. 6

AIR-FLOW CIRCUIT FOR AIR FLOW THROUGH A BEARING ENCLOSURE

CROSS-REFERENCE TO RELATED APPLICATIONS

This is the U.S. National Stage of PCT/FR2015/051153, filed Apr. 28, 2015, which in turn claims priority to French Application No. 1454327, filed May 15, 2014, the entire contents of all applications are incorporated herein by reference in their entireties.

TECHNICAL FIELD

The present invention relates to an air-flow circuit for an air flow through a bearing enclosure of a turbine engine.

STATE OF PRIOR ART

Prior art turbine engines generally include rolling bearings, called bearings, which are protected from the other components of the turbine engine by enclosures, called "bearing enclosures" that surround them.

Thus, FIG. 1 schematically represents a bearing enclosure of prior art. This bearing enclosure 1 enables a bearing for guiding a tubular shaft 8 to be isolated from the other parts of the turbine engine. The guiding bearing includes a fixed outer ring 9 mounted to a fixed part 10 of the turbine engine, a rotary inner ring 11 mounted to the tubular shaft 8 and rolling elements 7.

In order to ensure lubrication and cooling of the guiding bearing contained in the enclosure, it is necessary to inject a pressurised lubricant on the moving elements 11 and/or 7. To that end, the bearing enclosure 1 includes injection means 12. These injection means 12 generally include an inlet duct 2 connected to a spray nozzle 3 which enable the pressurised lubricant to be sent at the rotary ring 11 and/or the rolling elements 7. The bearing enclosure 1 also includes means 5 for recovering the lubricant which enable used lubricant to be discharged.

On the other hand, in order to ensure sealing of the bearing enclosure, this enclosure is closed by air seals 57 and pressurised air is injected into the bearing enclosure by virtue of these air injection means 7. This pressurised air is generally drawn downstream of the compression stage of the turbine engine, and more precisely downstream of the low pressure compressor of the turbine engine.

Finally, in order to avoid that the bearing enclosure 1 rises in pressure, the bearing enclosure also includes means 6 for discharging air. However, the air discharged by these discharge means 6 is loaded with a lubricant mist, such that it is necessary to purify it by filtering the lubricant it contains. This purification is generally performed by an oil-removal system. Such an oil-removal system is for example described in document FR2952402.

But, the presence of the oil-removal system causes a head loss in the air-flow circuit which passes through the bearing enclosure, such that the air pressure in the bearing enclosure increases. This increase in the pressure in the bearing enclosure is strongly detrimental to the sealing of the bearing enclosure and requires drawing air at a higher pressure at the compressor stages. This results in increasing the temperature of the air drawn and thus rises bearing cooling problems. Furthermore, drawing air at a higher pressure means that the compressor work provided by the compressors is more significant and as a result, there is a degradation in the turbine engine efficiency.

DISCLOSURE OF THE INVENTION

The invention aims at overcoming the drawbacks of the state of the art by providing an air-flow circuit for an air flow through a bearing enclosure of a turbine engine which limits air drawing and thus decreases the impact of the head loss of the oil-remover on cooling the bearings and on the turbine engine efficiency.

Another object of the invention is to provide a system enabling the head losses created by the oil-removal system to be compensated for in the air-flow circuit for an air flow through a bearing enclosure without adversely affecting the cooling of the bearings nor the turbine engine performance.

To do this, according to a first aspect of the invention, there is provided an air-flow circuit for an air flow through a bearing enclosure of a turbine engine in which a lubricant can be injected, the air-flow circuit including:

supply means arranged to supply air into the bearing enclosure, discharge means arranged to discharge at least some of the air-lubricant mixture contained in the bearing enclosure;

an oil-removal system connected to the discharge means, the oil-removal system being capable of separating the lubricant from the air contained in the air-lubricant mixture coming from the discharge means;

a compressor disposed between the discharge means and the oil-removal system, the compressor being capable of increasing the pressure of the air-lubricant mixture at the intake of the oil-removal system.

Thus, the compressor enables the pressure of the air-lubricant mixture which passes therethrough to be increased so as to at least attenuate the head loss generated by the oil-removal system. Thus, discharging the air-lubricant mixture contained in the bearing enclosure is promoted by the compressor in spite of the presence of the oil-removal system. The compressor thus enables the air/oil mixture of the bearing enclosure to be driven to the oil-removal system without having to increase the pressure of the air drawing at the compression stages of the turbine engine. The presence of the compressor in the air-flow circuit thus enables the discharge circuit of the air-lubricant mixture to be more efficient without the air drawing at the compression stages of the turbine engine being more significant and without impacting the cooling of the bearings and the turbine engine efficiency.

The circuit according to the first aspect of the invention can also have one or more of the characteristics hereinafter taken alone or according to any technically possible combinations.

When the oil-removal system generates a head loss, the compressor is preferably capable of compensating for at least some of the head loss generated by the oil-removal system. Thus, the oil-removal system does not impact the efficiency of the discharge circuit of the air-lubricant mixture.

According to different embodiments;

the compressor can be a centrifugal compressor, preferably consisting of one or more stages, which is particularly advantageous because such a compressor does not have any part in contact and is thus little sensitive to wear;

the compressor can be a positive displacement compressor, for example with a piston or a vane or with inner gears or outer gears.

Advantageously, the compressor includes at least one rotating shaft, the air-flow circuit further including power transmission means capable of rotatably driving the rotating shaft of the compressor.

According to a preferential embodiment, the power transmission means include an accessory gear box capable of transmitting the movement of the radial shaft of the turbine engine to the rotating shaft of the compressor, the accessory gear box including:
- a power take-off member capable of meshing with a radial shaft of the turbine engine;
- at least one kinematic chain capable of transmitting the rotational movement of the power take-off member to the rotating shaft of the compressor, the kinematic chain including a central shaft connected to the power take-off member through a gear, the central shaft being arranged to transmit the movement of the power take-off member to the rotating shaft of the compressor.

The central shaft preferably includes a distal end, the compressor being attached to the distal end of the central shaft which allows for space saving.

A second aspect of the invention also relates to a turbine engine including a bearing enclosure for a turbine engine, said bearing enclosure being delimited between a rotor rotatably movable about a reference axis and a stator including a bearing bracket to which a bearing laying against said rotor is mounted, said enclosure including means for feeding lubricant to said bearing and means for recovering lubricant, said enclosure including an air-flow circuit according to the first aspect of the invention.

According to a first embodiment, the turbine engine further includes preferably:
- a first compression stage arranged to compress air,
- first means for drawing at least some of the air contained in or at the outlet of the first compression stage, the supply means of the air-flow circuit being connected to the drawing means.

Thus, according to this embodiment, the air injected into the bearing enclosure is drawn in the first compression stage of the turbine engine, and the presence of the compressor in the air-flow circuit enables the air to penetrate more quicker the oil-removal system and thus to have a more efficient oil removal, without having to increase the air drawing to the first compression stage of the turbine engine.

According to a second embodiment, the turbine engine includes:
- an intake diffuser;
- a first compression stage;
- air drawing means, the air drawing means being located between the intake diffuser and the first compression stage.

More precisely, the air drawing means are preferably located downstream of the air diffuser and upstream of the first compression stage. In this way, the pressure rise in the intake diffuser is exploited, which enables a high enough drawing pressure to be kept without however having hot air and without using compression work of the compressor stages thereby by being further less detrimental to the turbine engine efficiency. The intake diffuser is preferably formed by a divergent cone which allows to slow down the air while increasing the static pressure.

According to a third embodiment, the turbine engine includes drawing means containing air at atmospheric pressure, the supply means of the air-flow circuit being connected to these drawing means. Thus, according to this third embodiment, the air is no longer drawn at the first compression stage. Indeed, the presence of the compressor downstream of the bearing enclosure enables air at atmospheric pressure to be used in order to be injected into the bearing enclosure. Indeed, the air at atmospheric pressure is sucked in the bearing enclosure by virtue of the compressor. This embodiment is advantageous because it enables the turbine engine efficiency not to be penalised.

BRIEF DESCRIPTION OF THE FIGURES

Further characteristics and advantages of the invention will appear upon reading the detailed description that follows, with reference to the appended figures, which illustrate:

FIG. 3, a side view of a turbine engine including an air-flow circuit according to one embodiment of the invention;

FIG. 4, a front view of a turbine engine including an air-flow circuit according to one embodiment of the invention;

FIG. 5, a perspective view of an accessory gear box, which accessories are attached to a compressor used in an air-flow circuit according to one embodiment of the invention;

FIG. 6, a cross-section view of a compressor used in an air-flow circuit according to one embodiment of the invention.

For the sake of clarity, identical or similar elements are marked with identical reference numerals throughout the figures.

DETAILED DESCRIPTION OF AT LEAST ONE EMBODIMENT

Figure 1:
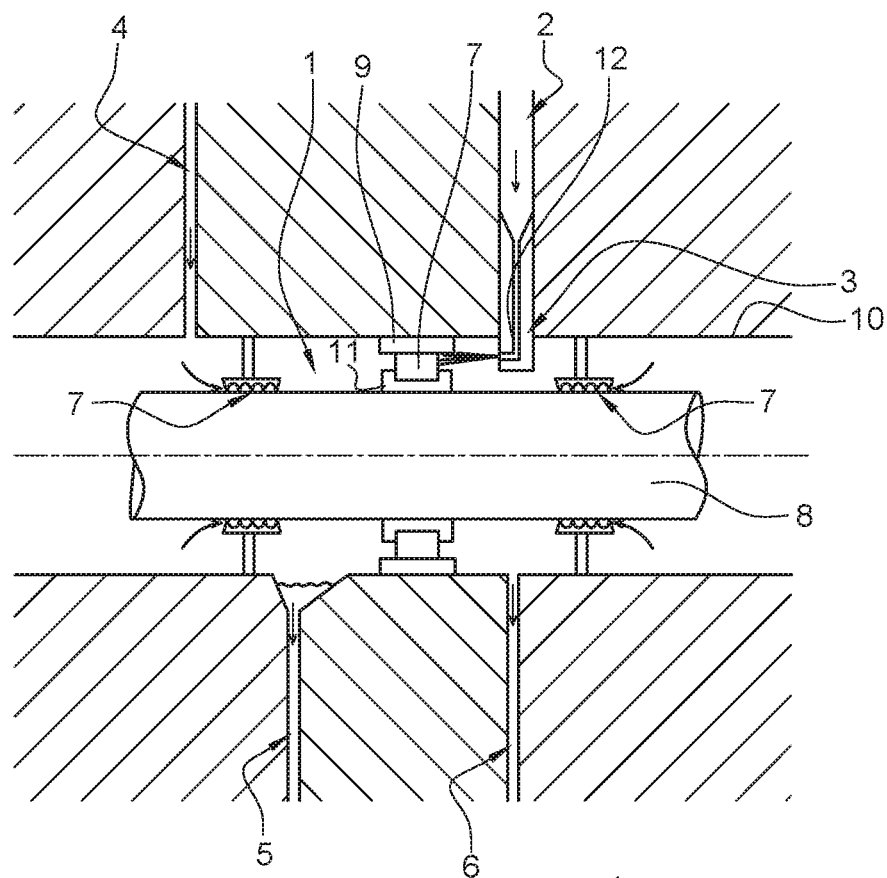
FIG. 1, a schematic representation of a bearing enclosure of prior art.
Figure 2:
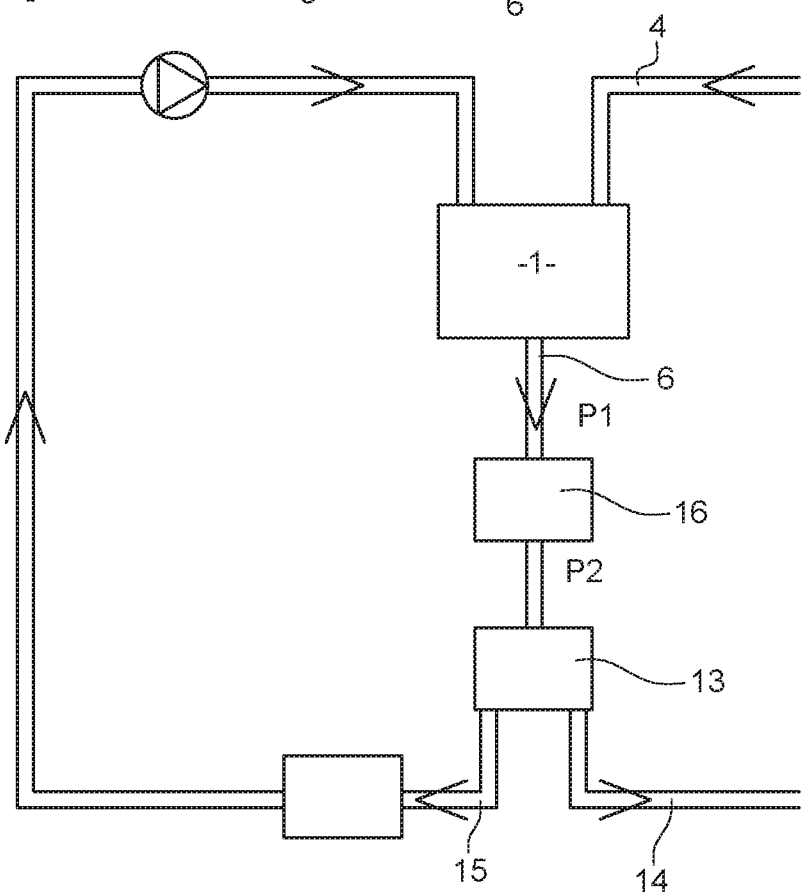
FIG. 2, a schematic representation of an air-flow circuit according to one embodiment of the invention.
Figure 7:
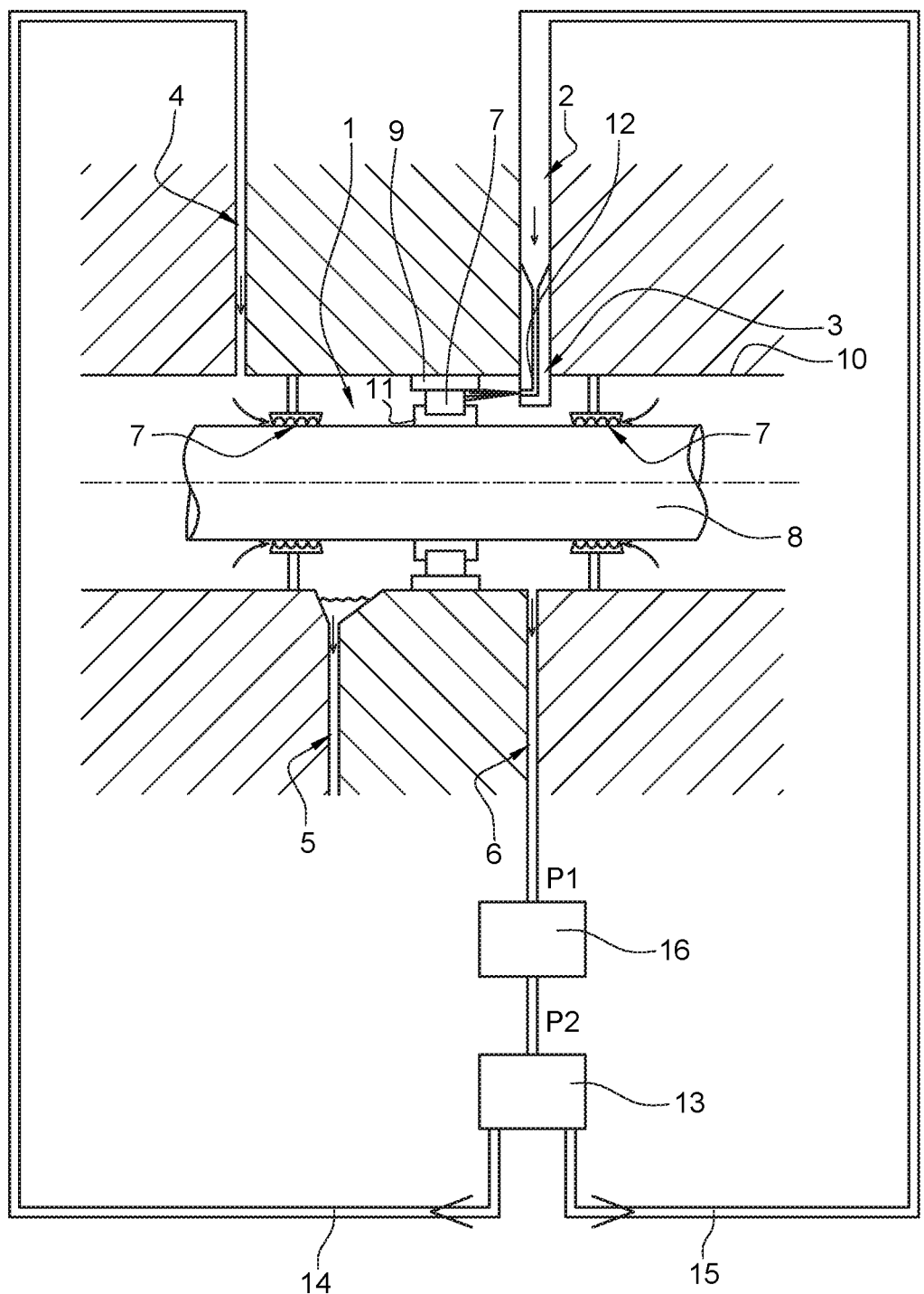
FIG. 7, a schematic representation of a bearing enclosure including an air-flow circuit according to one embodiment of the invention.

An air-flow circuit according to one embodiment of the invention is represented in FIG. 2. This air-flow circuit enables air to be flowed through a bearing enclosure 1 similar to that described with reference to FIG. 1. FIG. 7 is a schematic representation of a bearing enclosure 1 including the air-flow circuit of FIG. 2. The bearing enclosure 1 includes a bearing for guiding a tubular shaft 8 to be isolated from the other parts of the turbine engine. The bearing includes a fixed outer ring 9 mounted to a fixed part 10 of the turbine engine, a rotary inner ring 11 mounted to the tubular shaft 8 and rolling elements 7.

This air-flow circuit includes supply means 4 arranged to supply air into the bearing enclosure 1. According to different embodiments, this air can be drawn at one of the compression stages of the turbine engine, or it can be drawn in another zone of the turbine engine. The air-flow circuit also includes discharge means 6 arranged to discharge at least some of the air from the bearing enclosure 1. Since lubricant has been injected into the bearing enclosure by the injection means 12, the air discharged by the discharge means 6 is loaded with a lubricant mist. The discharged means 6 are thus connected to an oil-removal system 13 enabling the air 14 to be at least partially separated from the lubricant 15. Such an oil-removal system is for example described in document FR2952402.

In order to decrease the impact of the head loss created by the presence of this oil-removal system 13, a compressor 16 is inserted between the discharge means 6 and the oil-removal system 13. The compressor 16 is thus inserted between the bearing enclosure 1 and the oil-removal system 13.

The compressor 16 enables energy to be given to air such that it can move from the bearing enclosure 1 to the oil-removal system 13 in spite of the head loss created by the oil-removal system 13. In other words, the compressor 16 enables the air contained in the bearing enclosure 1 to be sucked so as to be directed to the oil-removal system 13. Thus, when the compressor 16 is operating, the pressure P2 of the air at the outlet of the compressor 16 is higher than the pressure P1 of the air at the intake of the compressor 16. The higher the difference between P2 and P1, the higher the energy communicated by the compressor to the air that passes through it.

The rise in pressure communicated by the compressor to the air that passes through it is preferably chosen so as to be higher than or equal to the head loss generated by the oil-removal system. Thus, the head loss created by the oil-removal system can be completely neutralised. In the case where the air is drawn by the supply means 4 at at least one of the compression stages of the turbine engine, the presence of the compressor thus enables air to be injected into the oil-removal system with more energy, which enables the oil-removal system to be more efficient. However, the presence of the compressor 16 can also enable less air or not at all to be drawn at the compression stages of the turbine engine so as to increase the efficiency thereof. Indeed, since the compressor 16 enables the pressure of the air which passes through the air-flow circuit to be risen, the air does not have to be necessarily drawn by the supply means 4 any longer at the compression stages of the turbine engine, but it can be drawn at another zone of the turbine engine, in which the air is for example at the outlet pressure of the diffuser or even at atmospheric pressure.

On the other hand, the compressor 16 is connected to power transmission means which enable it to be operated. For this, the compressor 16 generally includes a rotating shaft 17 which is capable of being rotatably driven by the power transmission means.

With reference to FIGS. 3 and 4, the power transmission means preferably include an accessory gear box 18 which is attached to a case 19 of the turbine engine. The accessory gear box 18 enables the rotating shaft 17 of the compressor to be rotatably driven. Such an accessory gear box 18, also called AGB, is for example described in documents FR no 1258196 or FR no 1359910.

With reference to FIGS. 3 and 5, corresponding to the cases where the accessory gear box is similar to that described in document FR no 1359910, this accessory gear box 18 includes:
- a power take-off member (not represented) capable of meshing with a radial shaft 25 of the turbine engine;
- at least one kinematic chain 26 capable of transmitting the rotational movement of the power take-off member to the rotating shaft 17 of the compressor, the kinematic chain including a central shaft 27 connected to the power take-off member through a gear, the central shaft being arranged to transmit the movement of the power take-off member to the rotating shaft of the compressor.

The central shaft 27 of the accessory gear box includes a distal end 28. The compressor 16 is preferably attached to this distal end 28 so as to be located in the extension of the central shaft 27 of the accessory gear box. Such a configuration allows for space saving.

According to a preferential embodiment, the compressor 16 is a centrifugal compressor, because it is little sensitive to wear and it enables the air pressure to be highly increased. However, the use of a positive displacement compressor, for example with a piston or a vane can be contemplated.

A compressor 16 that can be used in the air-flow circuit according to the invention is for example represented in FIG. 6. Such a compressor 16 includes a rotating shaft 17 which can be rotatably driven. This rotating shaft 17 enables a rotor 21 to be rotatably driven inside a stator 22. The air coming from the discharge means 6 is at the pressure P1 and it enters the space located between the rotor 21 and the stator 22 so as to be compressed in order to flow back to the oil-removal system at the pressure P2 higher than P1.

Of course, the invention is not limited to the embodiments described with reference to the figures and alternatives could be contemplated without departing from the scope of the invention. Other types of compressor than those previously described could in particular be used, or even the compressor could be driven by other means than those previously described.

The invention claimed is:

1. A turbine engine comprising a bearing enclosure, said bearing enclosure being delimited between a rotor rotatably movable about a reference axis and a stator including a bearing bracket to which a bearing laying against said rotor is mounted, said bearing enclosure including a system for feeding lubricant to said bearing and a recovery system for recovering lubricant, said bearing enclosure including an air-flow circuit for an air flow through said bearing enclosure of the turbine engine in which the lubricant can be injected, the air-flow circuit including:
   an air supply system arranged to supply air into the bearing enclosure;
   a discharge system arranged to discharge at least some of the air-lubricant mixture contained in the bearing enclosure;
   an oil-removal system connected to the discharge system, the oil-removal system being capable of separating the lubricant from the air contained in the air-lubricant mixture coming from the discharge system, and
   a compressor disposed between the discharge system and the oil-removal system, the compressor being capable of increasing the pressure of the air-lubricant mixture at an intake of the oil-removal system;
   a drawing system containing air at atmospheric pressure, the supply system of the air-flow circuit being connected to the drawing system.

2. The turbine engine according to claim 1, wherein the oil-removal system generates a head loss, the compressor being capable of compensating for at least some of the head loss generated by the oil-removal system.

3. The turbine engine according to claim 1, wherein the compressor is a centrifugal compressor.

4. The turbine engine according to claim 1, wherein the compressor is a positive displacement compressor.

5. The turbine engine according to claim 1, wherein the compressor includes at least one rotating shaft, the air-flow circuit further including a power transmission system configured to rotatably drive the rotating shaft of the compressor.

6. The turbine engine according to claim 5, wherein the power transmission system includes an accessory gear box capable of transmitting the movement of a radial shaft of the turbine engine to the rotating shaft of the compressor, the accessory gear box including:
- a power take-off member capable of meshing with a radial shaft of the turbine engine; and
- at least one kinematic chain capable of transmitting the rotational movement of the power take-off member to the rotating shaft of the compressor, the kinematic chain including a central shaft connected to the power take-off member through a gear, the central shaft being arranged to transmit the movement of the power take-off member to the rotating shaft of the compressor.

7. The turbine engine according to claim 6, wherein the central shaft includes a distal end, the compressor being attached to the distal end of the central shaft.

\* \* \* \* \*